United States Patent [19]

Schweitzer et al.

[11] Patent Number: 5,072,313
[45] Date of Patent: Dec. 10, 1991

[54] CONSTANT-DEVIATION REFLECTOR

[75] Inventors: Naftali Schweitzer; Joseph S. Bodenheimer, both of Jerusalem, Israel

[73] Assignee: Driver Safety Systems Ltd., Herzliya on Sea, Israel

[21] Appl. No.: 391,338

[22] Filed: Aug. 9, 1989

[30] Foreign Application Priority Data

Aug. 12, 1988 [IL] Israel .................................. 87441

[51] Int. Cl.$^5$ ......................... G02B 5/122; G02B 5/04
[52] U.S. Cl. ..................................... 359/529; 359/836; 359/900
[58] Field of Search ............... 350/286, 287, 500, 539, 350/173, 371, 102, 320; 351/212, 211; 354/10

[56] References Cited

U.S. PATENT DOCUMENTS

| | | | |
|---|---|---|---|
| 3,424,516 | 1/1969 | Snyder | 350/286 |
| 3,762,794 | 10/1973 | Arnaud | 350/7 |
| 3,798,666 | 3/1974 | Heller et al. | 350/286 |
| 4,171,870 | 10/1979 | Bruning et al. | 350/173 |
| 4,230,339 | 10/1980 | Moyroud | 354/10 |
| 4,302,079 | 11/1981 | White | 350/371 |
| 4,615,590 | 10/1986 | Alvarez et al. | 350/287 |
| 4,834,529 | 5/1989 | Barrett | 351/212 |

FOREIGN PATENT DOCUMENTS 1260818 3/1965 Fed. Rep. of Germany .
2202566 1/1972 Fed. Rep. of Germany .
7131152 1/1971 France .

OTHER PUBLICATIONS

"The Optician", vol. 143, No. 3712, May 25, 1962, pp. 513-518, Reflecting Prisms.

Primary Examiner—Bruce Y. Arnold
Assistant Examiner—James Phan
Attorney, Agent, or Firm—Panitch Schwarze Jacobs & Nadel

[57] ABSTRACT

A constant-deviation device is disclosed which comprises a first reflective element in the form of one or more roof prisms and one or more second reflective elements providing one or more reflections. The first and the second reflective elements are mutually adjustable by rotation about one or more axes thereby to set an angle between the incident and the exiting beam. In one or more planes the angle is substantially unaffected by changes in the direction of incidence of the incident beam.

14 Claims, 4 Drawing Sheets

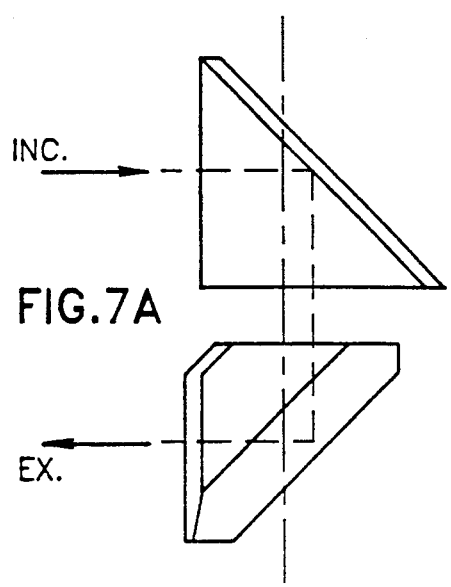
FIG.7A
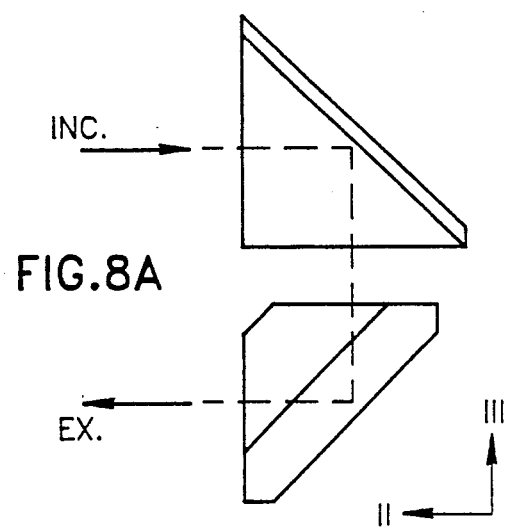
FIG.8A
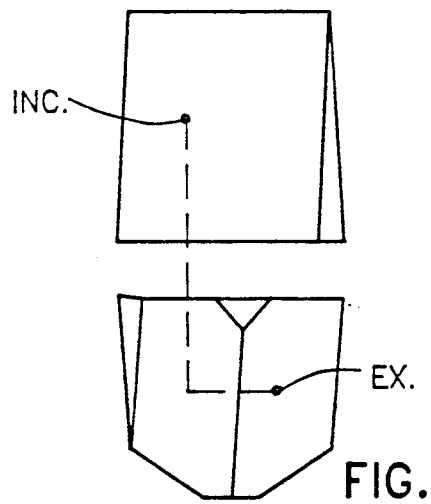
FIG.7B
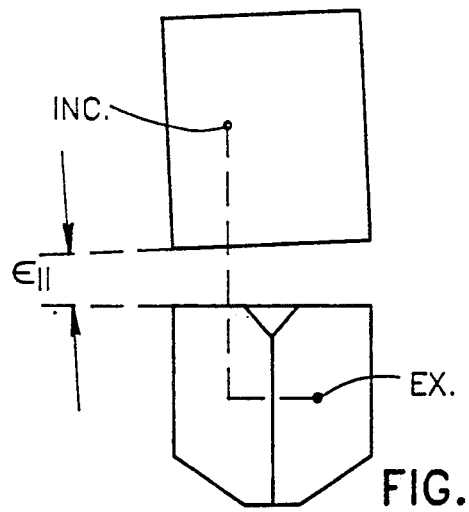
FIG.8B
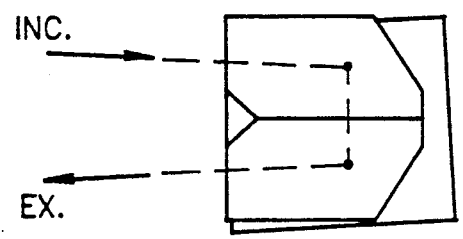
FIG.7C
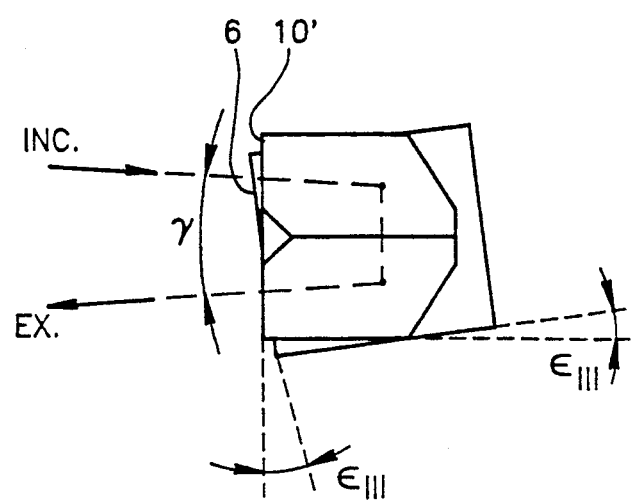

CONSTANT-DEVIATION REFLECTOR

FIELD OF THE INVENTION

The present invention relates to a constant-deviation reflector usable for transmission of optical signals through the atmosphere or through space and more particularly to redirection of such signals from one station to another.

BACKGROUND OF THE INVENTION

In many applications of optics, it is required to transmit light-in the visible or infrared regions of the spectrum—through the atmosphere, or through space. This applies not only to optical communications where information is transferred from a transmitter to a receiver by means of optical signals, but also to various methods of optical alignment, measurement at distance, and imaging.

In many of these cases, the optical path includes mirror or prism reflectors which redirect the optical beam, often returning it to a receiver located in proximity to the transmitter. In general, precise alignment of the reflector is necessary, otherwise the reflected beam will miss the receiver.

In order to render reflector systems insensitive to slight misalignment, certain optical devices have been designed for directive reflection at predetermined angles of deviation. These are called constant-deviation devices. The most common of these is the retroreflector. A retroreflector is a device in which radiation is returned in the direction from which it came (180 degrees deviation), this property being maintained over a wide range of directions of incident radiation. The range of directions for which the device functions as a retroreflector may be limited to one of specific plane of incidence, as in a Porro prism. A retroreflector which is not limited to one specific plane of incidence usually comprises either three mirrors with mutually perpendicular surfaces, or a prism that forms the corner of a cube cut along a hypotenuse face. These configurations are known as corner reflectors. An additional example of a constant-deviation device, providing 90 degree deviation, is the pentaprism.

In a known reflector of this type, the mirrors are mutually adjustable. This enables reflection of incident radiation to directions other than the return direction, while preserving the characteristic of constant-deviation, i.e., that the angle between the reflected and incident beams (the deviation angle) remains constant over a wide range of directions of incident radiation.

Disadvantages of the above constant-deviation reflector include the following:

1. The adjustments of the mirrors are mutually dependent, and initial setup is therefore difficult, considerable calculation and subsequent manipulation being needed to guide the beam precisely to the required direction. Particularly, for each plane of incidence, each mirror must be positioned at a precise angular orientation relative to the others, and relative to the plane of incidence, in order to achieve stabilization. Each change requires a corresponding change in the mounting (and the housing) of each component to compensate for such a change.

2. The system is not very stable, and relatively minor environmental changes can affect the deviation angle, thereby rendering the system ineffective.

3. The mirrors are sensitive to contamination and other damage to the reflective surfaces.

SUMMARY OF THE INVENTION

It is an object of the present invention to substantially reduce or overcome the limitations and drawbacks of prior-art constant-deviation reflectors and to provide a beam-stabilizing or constant-deviation reflector, the initial adjustment of which is uncomplicated, as no corrective readjustment is required in the mounting of one component for a change in the position of the other, and which does not require computation of the correct angles for each plane of incidence; which once set to a given angle of deviation, is completely stable, being largely unaffected by environmental factors, and which has all the advantages of prism devices versus mirror devices, such as resistance to contamination and other damage to the reflective surfaces, as well as total reflection providing higher radiation throughput than mirrors.

According to an embodiment of the invention, this is achieved by providing a constant-deviation device comprising a first reflective element in the form of one or more proof prisms and one or more second reflective elements, each providing one or more reflections, the first and second reflective elements being mutually adjustable by rotation about one or more axes to set an angle between the incident and the exiting beam, wherein in at least one plane the angle is substantially unaffected by changes in the angle of incidence of the incident beam.

BRIEF DESCRIPTION OF THE DRAWINGS

The present invention will be understood and appreciated more fully from the following detailed description taken in conjunction with the drawings, in which:

FIGS. 7A, 7B and 7C show the effect of rotating the prisms about axis III;

FIGS. 8A, 8B and 8C indicate the effect of rotating the prisms about axis II.

DETAILED DESCRIPTION OF THE INVENTION

Figure 1:
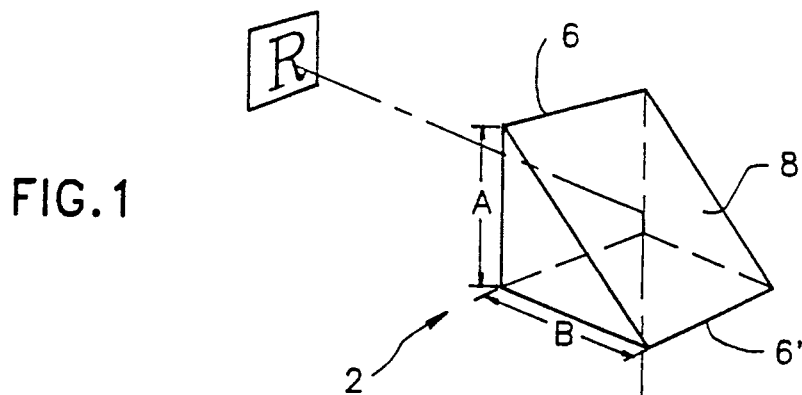
FIG. 1 is a perspective view of a right-angle prism, including the image it produces of an object.
Figure 2:
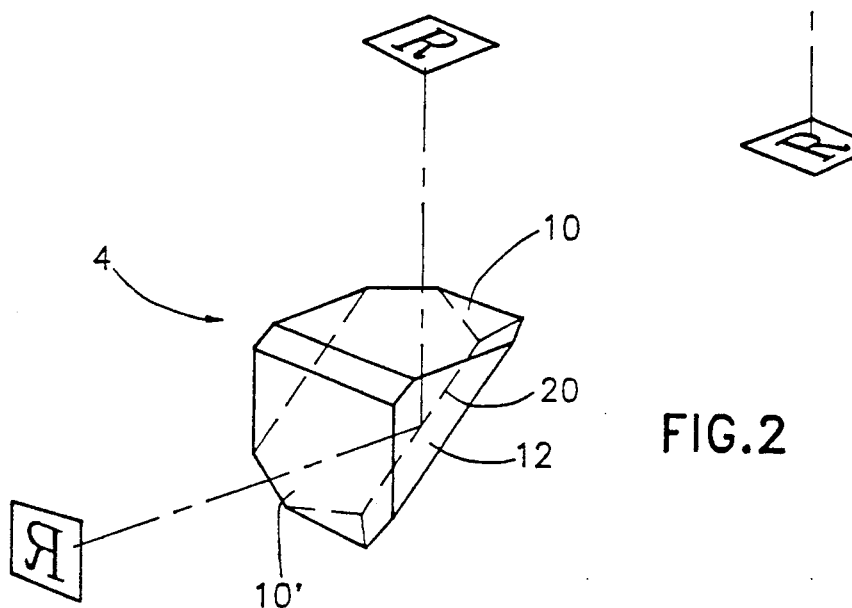
FIG. 2 is a view of an Amici prism, similar to the view of the right-angle prism of FIG. 1.
Figure 3:
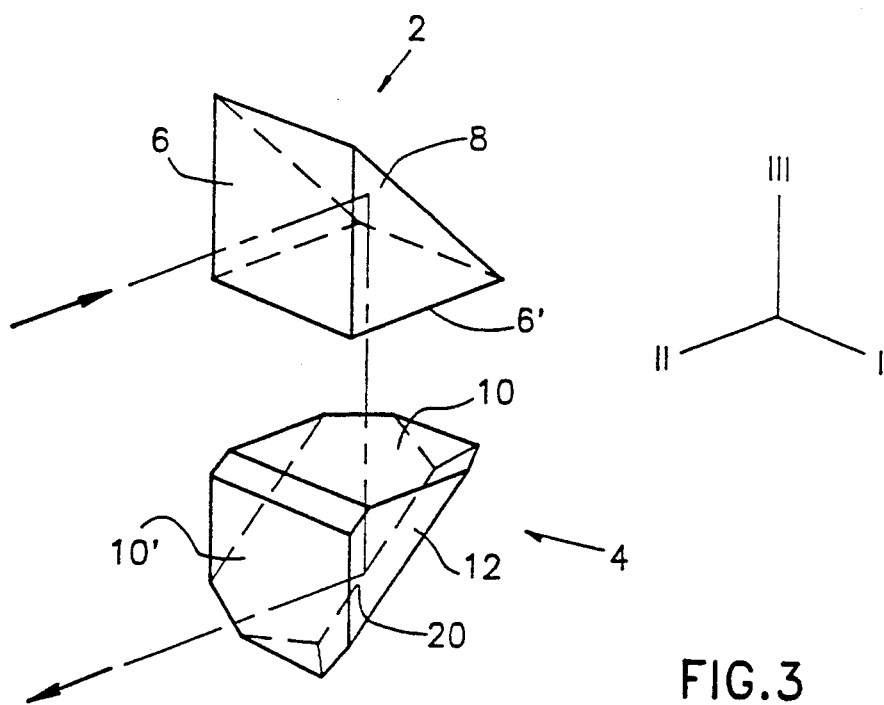
FIG. 3 represents the combination of a right-angle prism and an Amici prism, as well as the three principal axes about which either prism can be rotated to produce the required angle of deviation.

Referring now to the drawings, there are seen in FIGS. 1 and 2, the two reflective elements of which the preferred embodiment of the present invention, shown in FIG. 3, is comprised. Specifically, FIG. 1 shows a right-angle prism, referenced generally 2 and FIG. 2 shows a roof prism, referenced generally 4, of the type known as an Amici prism. The Amici prism has a pair of mutually perpendicular roof surfaces 12 which intersect along a line 20, which lies in the plane of symmetry (not shown) of the prism. Both the right-angle and Amici prisms are well known in the art and need no further description or explanations, except to note that the lengths A and B of the short faces of the right-angle prism are equal.

FIG. 3 shows a combination of right-angle prism 2 and Amici prism 4, which combination constitutes a preferred embodiment of the device according to the invention. The three coordinate axes designated I, II and II, represent axes about which the prisms can be rotated or tilted, as described further below.

The incident light beam enters the right-angle prism 2 through one of its short faces, 6, is totally reflected by the hypotenuse face 8, exits the right-angle prism 2 via its other short face 6' and enters the Amici prism 4 via its short face 10. The beam is then twice totally reflected by the 90 degree roof surfaces shown generally at 12 and exits the system through the other short face 10' of the Amici prism 4.

When the adjacent short faces 6', 10 are parallel to each other ensuring that the entrance and exit faces 6, 10' (FIGS. 4A, 4B, 4C) are also parallel, this system acts as a constant-deviation retroreflector, much the same as a corner reflector. As a retroreflector it has significant advantages over conventional corner reflectors, on that it is possible to adjust the two prisms to an accuracy obtained only in high-quality corner reflectors.

Since only the two roof surfaces require a precise angle of 90 degrees between each other, and the right-angle prism can be aligned manually to an exact position, the pair of prisms of the present invention is much less expensive, particularly when a relatively large reflective system is required, than a single corner cube, in which three surfaces have to be manufactured by grinding and polishing to ensure precise mutual perpendicularity. An additional advantage is the possibility of separating the prisms by translation, thus translating the return or exit beam, while it remains parallel to the incident beam.

In the retroreflector arrangement as shown in FIGS. 3 to 4C, FIG. 4A is an elevational view of the system as projected onto plane I in direction of axis I of FIG. 3. Here, as well as in the following figures, the planes are perpendicular to the axes of corresponding Roman numerals.

As already stated, the entrance and exit faces 6 and 10', respectively, are parallel, as are the adjacent faces 6' and 10. In the shown example, faces 6 and 10' are also coplanar. The incident and the exit beams are thus parallel and the deviation of the exit beam relative to the incident beam equals $\alpha = 180$ degrees (i.e., the light travels along parallel paths, but in opposite directions). As will be appreciated by one skilled in the art, this relationship will hold true regardless of the actual angle of incidence (shown in FIG. 4A to be 90 degrees).

Figure 4B:
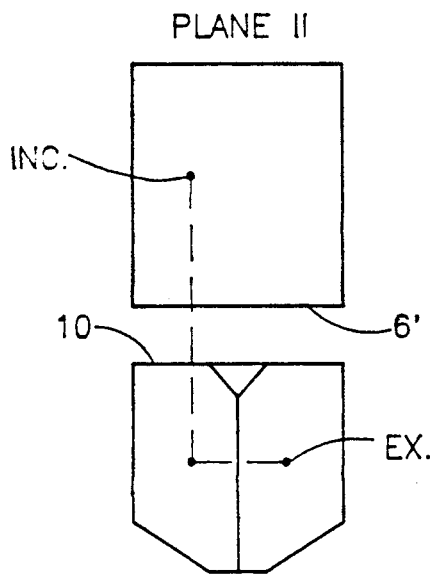
FIGS. 4A, 4B and 4C are, respectively, an elevational, side and bottom view of the constant-deviation device according to the invention as used as a retroreflector.
Figure 4A:
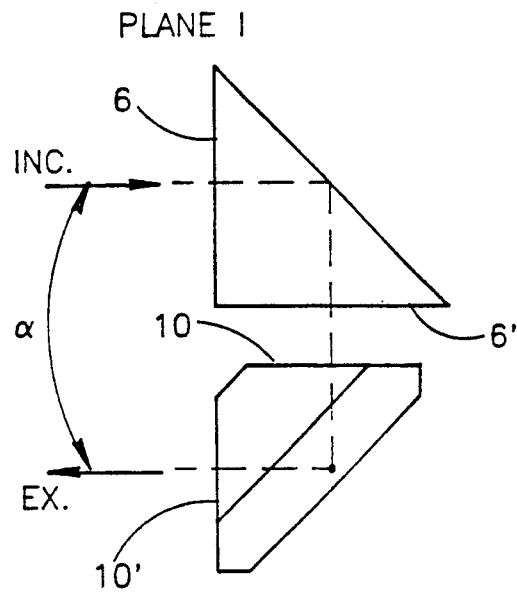
Figure 4C:
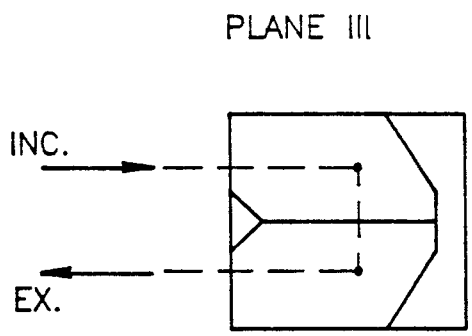

FIG. 4B shows the system in side view, as projected onto plane II in direction of axis II of FIG. 3, with the incident and exit beams, being normal to the paper, appearing as points only. FIG. 4C is a bottom view, as projected onto plane III in direction of axis III in FIG. 3.

Figure 5:
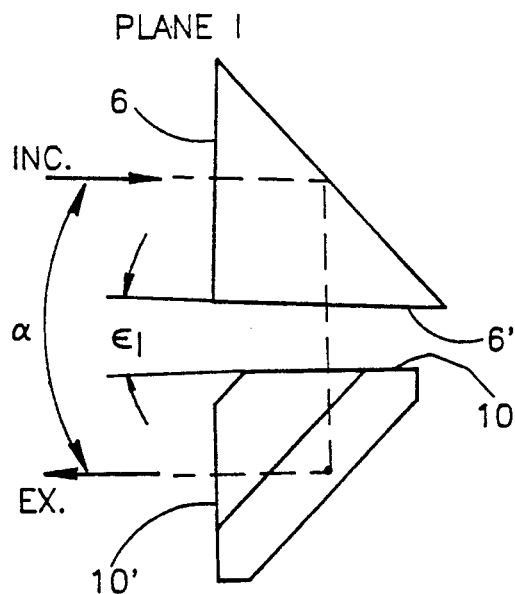
FIG. 5 illustrates the device of FIG. 3, but with the two prisms mutually tilted about axis I to produce $\epsilon \neq 0$.

When the prisms 2 and 4 are oriented such that the angle between the adjacent short faces 6' and 10, respectively, in plane I of FIG. 5 is changed to $\epsilon_I \neq 0$, then the angle between the incident and exit beams in that plane will be $\alpha = 180 + 2\epsilon_I$, irrespective of the angle of incidence. The same is true also if the beam direction is reversed, i.e., if the light first enters the Amici, and exits via the right-angle prism.

Figure 6B:
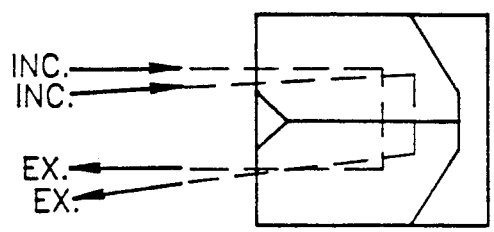
FIGS. 6A and 6B demonstrate the beam-stabilizing effect of the prism system in various planes of incidence.
Figure 6A:
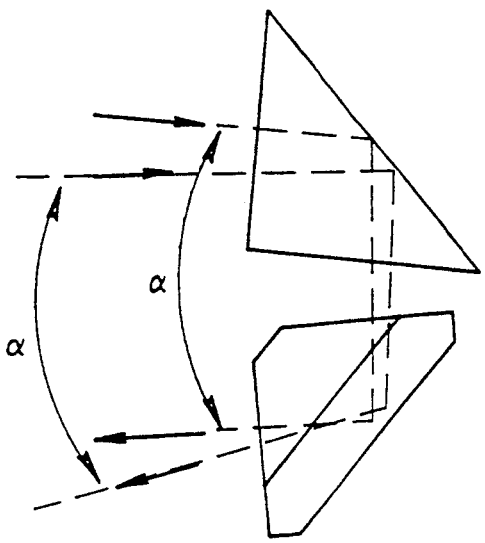

Thus, the two-prism combination of the present invention acts as a constant-deviation reflector in plane I, with a deviation angle of $180 + 2\epsilon_I$ (see FIG. 5). It will also act as a beam stabilizing reflector for other planes of incidence, as demonstrated in FIGS. 6A and 6B. Therefore, the alignment of this device relative to the incident beam has little or no effect on the direction of the return beam. The deviation angle can be adjusted by variation of the angle $\epsilon_I$, which may be achieved by rotation of either of the prisms relative to the other, with respect to axis I.

However, although the system is a constant-deviation device for any angle $\epsilon_I$ in plane I, the stabilization effect of the device for incident beams outside plane I is gradually reduced as $\epsilon_I$ becomes larger, until for $\epsilon_I = 45$ degrees there is essentially no beam stabilization except in plane I. Therefore, the device is particularly useful at small angles of deviation.

Two additional axes II and III are now selected, axis II being conveniently chosen as the bisector of angle $\epsilon_I$, and axis III, together with axes I and II, constituting a Cartesian system of axes, as in FIG. 3. Referring now to FIGS. 7A–7C, $\epsilon_{III}$ (FIG. 7C) is the angle between the entrance and exit faces 6 and 10' in plane III, obtained by rotating either of the prisms relative to the other about axis III. The angle between the incident and exit beams in plane III perpendicular to axis III will be gamma $= K_3 \epsilon_{III}$ for small deviations and is not sensitive to alignment of the device relative to the incident beam. The return beam can thus be steered to any desired elevation angle gamma. It will be appreciated that $K_3$ is a known constant.

Although at $\epsilon_{III} \neq 0$ this device is no longer a true constant-deviation device, for small angles $\epsilon_{III}$ it still acts as a beam stabilizing reflector. FIGS. 8A–8C show that a similar effect is obtained by adjustment of $\epsilon_{II}$, by rotation of either of the prisms about axis II ($\beta = K_2 \epsilon_{II}$, $K_2$ also being a known constant).

Also, as mentioned above, it is possible to shift the exit beam to a path parallel to that of the incident beam by translation of the second prism about axis III.

A specific application of the present invention, in which a reflector is used to return a beam emitted by an infra-red transmitter at a distance of 3 to 10 meters to a photo-detective receiver positioned above the transmitter, may be used to monitor and measure precisely the time sequence of events in which such a beam is interrupted and subsequently restored.

In this application, the angle between the incident and return beams may vary from 179.00 to 179.95 degrees, depending on the configuration of the system, and the accuracy required is typically 0.01 degree. High efficiency "cat's eye" retroreflectors were found to be ineffective in returning beam to the receiver with sufficient intensity. Corner cube reflectors, while capable of sufficient intensity, return the beam directly to the transmitter. Although it is possible to manufacture a distorted corner cube which would return the beam in the required direction, by precisely calculating the required angles between the reflective surfaces, such a modified corner reflector would be prohibitively expensive to manufacture with the precision required. Furthermore, each configuration would require different angles between the reflective surfaces, and the prism surfaces would therefore have to be calculated and manufactured individually. This is clearly impractical.

A practical solution is offered by the present invention using a combination of an Amici prism with a 90 degree prism. The transmitter-receiver configuration is set up in a laboratory and a mechanical fixture is provided to hold the two prisms. The fixture enables fine adjustment of the above-mentioned angles $\epsilon_I$ and $\epsilon_{III}$ between the Amici and the 90 degree prisms, by means of, for example, set screws. These adjustments having been carried out, a drop of UV-curable adhesive is introduced between the adjacent surfaces of the prisms, with care taken to avoid air inclusions. Final adjustment of $\epsilon_I$ and $\epsilon_{III}$ is performed to maximize the signal at the receiver, whereby it is found that changes of 0.01 degrees may produce significant changes in the receiver output. After the output is maximized, the prisms are exposed to UV light from a mercury lamp, and within less than a minute the adhesive is cured. Once the prisms are rigidly joined together, they are removed from the fixture and are mounted in a fixed metal housing. The alignment of the prism-pair in the housing is not critical, nor is the angular alignment of the housing relative to the incident beam. This demonstrates the beam stabilization effect. It has been found in practice that for a deviation angle of 179.80 degrees, a rotation of the prism-pair about axes I and III of $\pm 10$ degrees produces a change in direction of the return beam of less than $\pm 0.01$ degrees.

Figure 9:
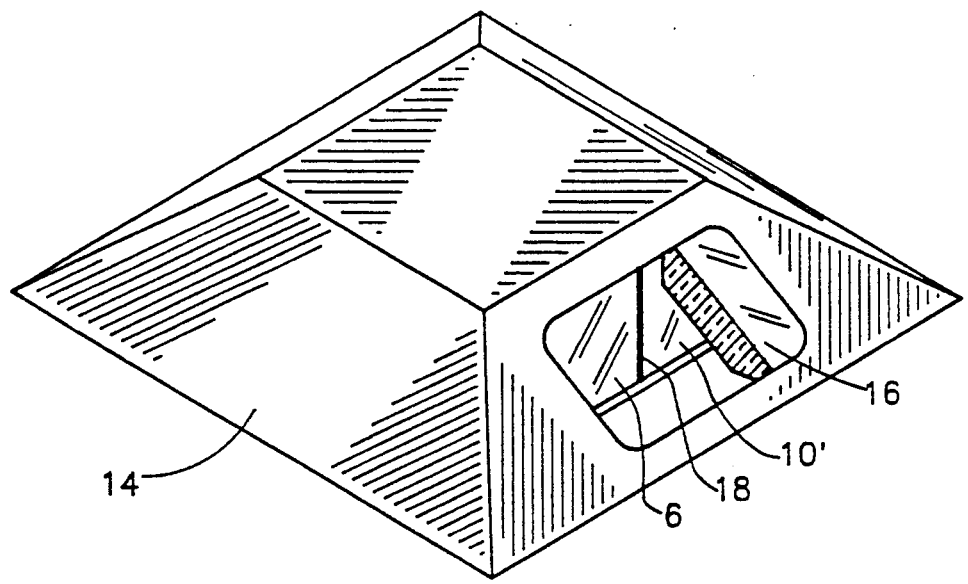
FIG. 9 is a perspective view of the constant-deviation prisms according to the invention inside a housing, as used in one application of these prisms.

FIG. 9 shows a cat's-eye type of housing 14 in which are arranged the pair of prisms, of which is seen the short face 6 of the right-angle prism and the short face 10' of the Amici prism. For protection, the prisms are mounted behind a solid window 16 made of a transparent material, part of which has been cut away for better understanding. As shown, the two prisms are cemented together along a join line, referenced 18.

Another embodiment is envisaged in which the entrance and exit surfaces face opposite directions, thus constituting a line-of-sight device that is stabilized in one plane, typically the horizontal plane, and which counteracts wobble which occurs in telescopes, binoculars and cameras.

It will be appreciated by persons skilled in the art that the present invention is not limited by what has been particularly shown and described hereinabove. The scope of the present invention is defined only by the claims which follow:

We claim:
1. A constant-deviation reflector device comprising a first discrete reflective element in the form of at least one roof prism and at least one second discrete reflective element providing at least one reflection, said first and said second reflective elements being mutually adjustable by rotation about at least a first axis to set an angle between an incident and an exiting beam, wherein in at least one plane said angle is substantially unaffected by changes in the direction of the incident beam.

2. A constant-deviation reflector device according to claim 1 and wherein said at least one plane is identical with, or parallel to, the plane of symmetry of said roof prism which contains the line of intersection between the two roof surfaces thereof, and wherein said first axis is perpendicular to said plane.

3. A constant-deviation reflector device according to claim 1 and wherein said roof prism is an Amici prism.

4. A constant-deviation reflector device according to claim 1 and wherein said second reflective element is a right-angle prism.

5. A constant-deviation reflector device according to claim 1 and wherein said first and said second reflective elements are further mutually adjustable about a second axis extending in a direction perpendicular to the direction of said first axis, and about a third axis extending in a direction perpendicular to both said first and said second axis.

6. A constant-deviation reflector device according to claim 1 and wherein the exiting beam is shiftable to a path parallel to that of the incident beam by translation of the reflective element from which said beam exits, relative to the other reflective element.

7. A constant-deviation reflector device according to claim 1 and wherein said angle having been set, said two reflective elements are cemented together, using a transparent cement.

8. A constant-deviation reflector device according to claim 7 and wherein said transparent cement in UV-curable.

9. A method of constructing a constant-deviation reflective device comprising the steps of:
providing a first discrete reflective element in the form of at least one roof prism and at least one second discrete reflective element providing at least one reflection,
adjusting the spatial relationship of said first and said second reflective elements by rotation of at least one of the first and second reflective elements about at least a first axis; and
fixing the spatial relationship of said first and said second reflective elements.

10. A method according to claim 9 and wherein said first axis is perpendicular to a plane, which is identical with, or parallel to, the plane of symmetry of said roof prism which contains the line of intersection between the two roof surfaces thereof.

11. A method according to claim 9 and wherein said roof prism is an Amici prism.

12. A method according to claim 9 and wherein said second reflective element is a right-angle prism.

13. A method according to claim 9 and wherein said adjusting step also comprises the step of adjusting the spatial relationship of said first and said second reflective elements about a second axis extending in a direction perpendicular to the direction of said first axis, and about a third axis extending in a direction perpendicular to both said first and said second axis.

14. A method according to claim 9 and wherein said adjusting step also includes translation of said first reflective element relative to said second reflective element.

* * * * *